(12) United States Patent
Baldemair et al.

(10) Patent No.: US 8,385,264 B2
(45) Date of Patent: Feb. 26, 2013

(54) METHOD AND ARRANGEMENT FOR REPEATER/RELAY CONTROL

(75) Inventors: Robert Baldemair, Solna (SE); Pål Frenger, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 652 days.

(21) Appl. No.: 12/579,818

(22) Filed: Oct. 15, 2009

(65) Prior Publication Data
US 2011/0014911 A1    Jan. 20, 2011

Related U.S. Application Data

(60) Provisional application No. 61/226,068, filed on Jul. 16, 2009.

(51) Int. Cl.
*H04W 4/00*    (2009.01)

(52) U.S. Cl. .................................... 370/328; 370/341
(58) Field of Classification Search .................. None
See application file for complete search history.

(56) References Cited

U.S. PATENT DOCUMENTS

| | | | |
|---|---|---|---|
| 2008/0273479 A1* | 11/2008 | Kwak et al. | 370/311 |
| 2010/0054137 A1* | 3/2010 | Deng et al. | 370/247 |
| 2011/0306334 A1* | 12/2011 | Brunel et al. | 455/422.1 |
| 2012/0058719 A1* | 3/2012 | Gan et al. | 455/10 |

* cited by examiner

*Primary Examiner* — Derrick Ferris
*Assistant Examiner* — Kodzovi Acolatse
(74) *Attorney, Agent, or Firm* — Roger S. Burleigh

(57) ABSTRACT

In a method in a controllable repeater in a telecommunication system, said system comprising a radio base station, at least said controllable repeater and a plurality of user terminals, receiving a list of associated user terminal identities for said repeater, and searching for and decoding downlink channel control messages based on said provided list.

11 Claims, 13 Drawing Sheets

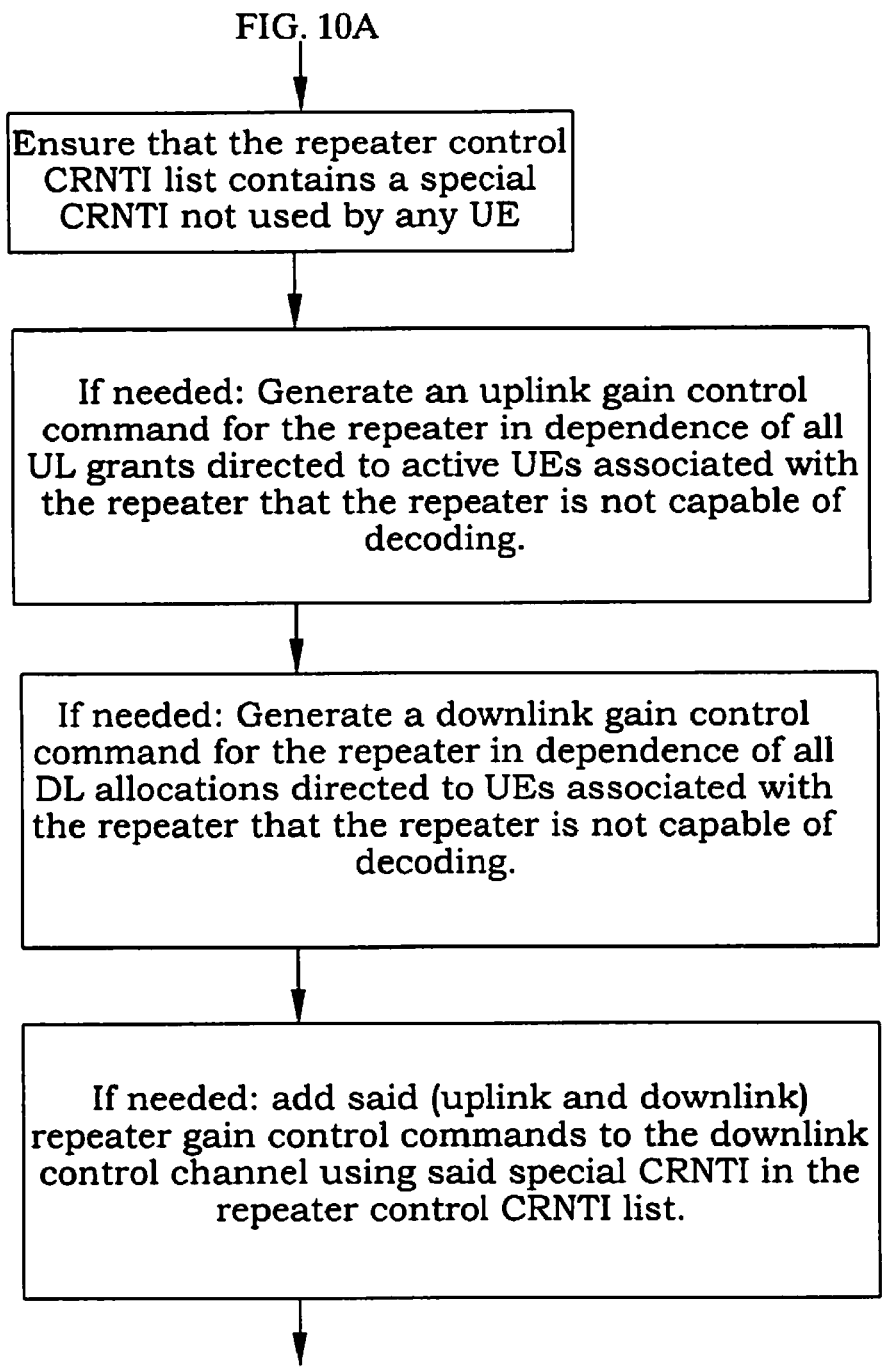

METHOD AND ARRANGEMENT FOR REPEATER/RELAY CONTROL

CROSS-REFERENCE TO RELATED APPLICATIONS

This application claims the benefit of U.S. Provisional Application No. 61/226,068, filed Jul. 16, 2009 and International Application No. PCT/SE2009/051015, filed on Sep. 11, 2009, the disclosures which are incorporated herein by reference.

BACKGROUND

Abbreviations used herein shall have the following meanings:
AF Amplify-and-Forward
CRC Cyclic Redundancy Check
DCI Downlink Control Information
DF Decode-and-Forward
DFTS Decode and Forward TS
DL Downlink
FSR Frequency Selective Relay (Repeater)
FTR Frequency Translating Relay (Repeater)
OFDM Orthogonal Frequency Division Multiplex
OFR On-Frequency Relay (Repeater)
PDCCH Physical Downlink Control CHannel
CRNTI Cell Radio Network Temporary Identifier
TTI Transmission Time Interval
UL Uplink One recent development within modern telecommunication standards is the so-called Long Term Evolution (LTE) radio interface, and a further development of the LTE, namely LTE Advanced. These are both OFDM based systems.

One of the most important improvement areas in the so-called LTE-Advanced technology is the increase of data rates available for users at the cell edge and indoor. A very promising technique to achieve high data rates in such difficult locations is the deployment of relays. Relays are usually classified into Layer 1 (L1), Layer 2 (L2), and Layer 3 (L3) relays depending on which Open System Interconnection (OSI) layer they operate on. The OSI model is a conceptual model for telecommunication consisting of 7 layers (physical, data-link, network, transport, session, presentation, and application) Note however that the different layers refer to the user plane of the relay node and a L1 relay may use e.g. L3 control plane signaling.

L1 relays are commonly denoted Amplify-and-Forward (AF) relays or sometimes equivalently repeaters. An AF repeater operates in the physical layer and its basic functionality is, as the name suggests, amplifying and then forwarding the received signal, including any received noise and interference.

L2 relays operate in the data link layer and have the ability to detect and possibly correct errors that have occurred in the physical layer. L2 relays are therefore commonly called Decode-and-Forward (DF) relays as they decode the received data prior to retransmission. DF relays will, at the expense of an increased delay, not forward noise and interference.

L3 relays operate in the network layer and are by the Third Generation Partnership Program (3GPP) regarded as being equivalent to eNodeBs (eNBs) that are wirelessly connected to a donor cell via self-backhauling. L3 relays have the same characteristics as L2 relays in the sense that they do not forward noise and interference as they perform decoding and error correction of the received signal prior to retransmission.

There are several known methods of utilizing various repeaters or relays to further improve the quality of performance in telecommunication systems. Some of the most common include:

Cooperative relaying which enables multiple relays to cooperate during transmissions to users. For example, the cooperation may be used for increased diversity or multiplexing of data.

Multi-hop relaying which enables signals to be conveyed from a source to a destination over two or more wireless hops. The multiple hops are achieved by relaying the signal via one or more relay(s)/repeater(s). It may be used to reduce the end-to-end path loss and thus extending the coverage.

On frequency relays (or repeaters) (OFR) which are relays (repeaters) that forward on the same frequency band occupied by the received signal.

Frequency translating relays (or repeaters) (FTR) which are relays (repeaters) that translate the retransmitted signal to another frequency band that is different from that occupied by the received signal.

Frequency selective relays (or repeaters) (FSR) which are relays (repeaters) that may dynamically retransmit coordinated parts of the received signal bandwidth.

The increased path gain that comes from splitting of the signal path in two hops by repeating or relaying in an intermediate node brings several benefits: Data rates can be significantly increased; transmit power can be reduced and inter-cell interference falls rapidly. A multi-hop solution based on AF repeaters has some interesting characteristics compared to other DF relaying solutions. Since a repeater can receive and transmit on the same radio resource, which is not possible for DF types of relays, it is possible to operate without any duplex coordination loss between the two hops. A decode-and-forward (DF) relay can forward the data on the same frequency resource. However, since the decoding operation will result in an unavoidable delay the forwarding must take place at a later time instance, i.e. on another radio resource. In contrast, an amplify-and-forward (AF) repeater has a delay that typically is negligible compared to the transmission time interval, hence it can forward on the same radio resource. Repeaters also introduce less delay than DF relays which is beneficial for the performance of higher layer protocols such as TCP. Furthermore, a repeater is a simple device that typically is fairly cost efficient.

In particular, the use of OFR in OFDM based systems is interesting if the delay of the repeater is limited to the length of cyclic prefix of the OFDM modulation. In the air, the repeated signal path and the direct signal path add in the same way as normal multi-path does. In case of LTE, the additional time dispersion induced by the repeater does not result in any additional receiver complexity and/or reduced performance due to increased self interference as long as the total time dispersion is limited to the length of the cyclic prefix. Note that is not the case for single-carrier systems without cyclic prefix e.g. HSPA, where additional time dispersion typically increases the receiver complexity (i.e. more rake fingers are required) as well as the self-interference (i.e. signal components with a relative delay difference are non-orthogonal).

Despite the benefits of utilizing AF repeaters, there are a few disadvantages that prevent the use from providing the full benefit of them.

One drawback with repeaters compared to DF relays is that they forward not only signals but also noise and interference. Furthermore, a major challenge for on-frequency repeaters is to sufficiently suppress the self-interference they induce.

Repeaters (and relays) are efficient for both providing coverage in areas without coverage (see upper part of FIG. 1) and also to provide increased data rates to areas with weak signal strength (lower part of FIG. 1). This distinction is important since in the data-rate extension case the users will receive both a direct signal part as well as a repeated signal path, witch in the case of DF relaying will interfere with each other and in case of AF repetition and OFDM will add like multipath. In addition, since AF repeaters amplify noise and interference they are only beneficial in case it is possible to replace one weak radio link with two significantly better radio links. This is more likely to be possible when the original radio link is weak due to some obstacle (e.g. a wall) that hinders the radio waves rather than pure propagation distance.

In addition, in the data rate extension scenario it is possible to dynamically turn the repeater on and off without losing coverage. It is also possible to do frequency selective repetition in the data-rate extension case without destroying the communication on the uplink and downlink control channels. Furthermore, the data-rate extension case is also particularly relevant for LTE and LTE-Advanced since, in order to compete with HSPA, their main business case is to provide high data-rates, which are only achievable in case the signal strength also is high.

In the coverage extension scenario, the options when it comes to advanced repeater behavior are more limited. It is not possible to e.g. turn the repeater off even when the repeater does not serve any UEs since that would leave the area with no coverage. In that case a UE wanting to perform an initial access would not be able to read the broadcast channel (BCH) and the system information blocks (SIBs) required for random access. Furthermore, an idle UE would not detect any paging messages sent from the network. In the coverage area extension case it is also not possible to perform frequency selective repetition on the downlink since that would hinder the UE from receiving the physical downlink control channel (PDCCH) that covers the whole downlink bandwidth. Also any frequency selective operation by the repeater on the uplink band must assure that the resources used for the physical uplink control channel (PUCCH) as well as the physical random access channel (PRACH) are always repeated.

Consequently, there is a need for a more efficient use of repeaters.

BRIEF SUMMARY OF THE INVENTION

The present invention relates to improved methods of relaying in telecommunication systems.

Basically, a method in a controllable repeater in a telecommunication system, said system comprising a radio base station, at least said controllable repeater and a plurality of user terminals, comprises the steps of receiving a list S10 of associated user terminal identities for the controllable repeater, and searching for and trying to decode S20 downlink channel control messages based on said provided list.

Advantages of the present invention include improved relaying and reduced control signaling.

BRIEF DESCRIPTION OF THE SEVERAL VIEWS OF THE DRAWING

The invention, together with further objects and advantages thereof, may best be understood by referring to the following description taken together with the accompanying drawings, in which:

FIG. 10B is a continuation of the flow-chart in FIG. 10A;

DETAILED DESCRIPTION OF THE INVENTION

Figure 1:
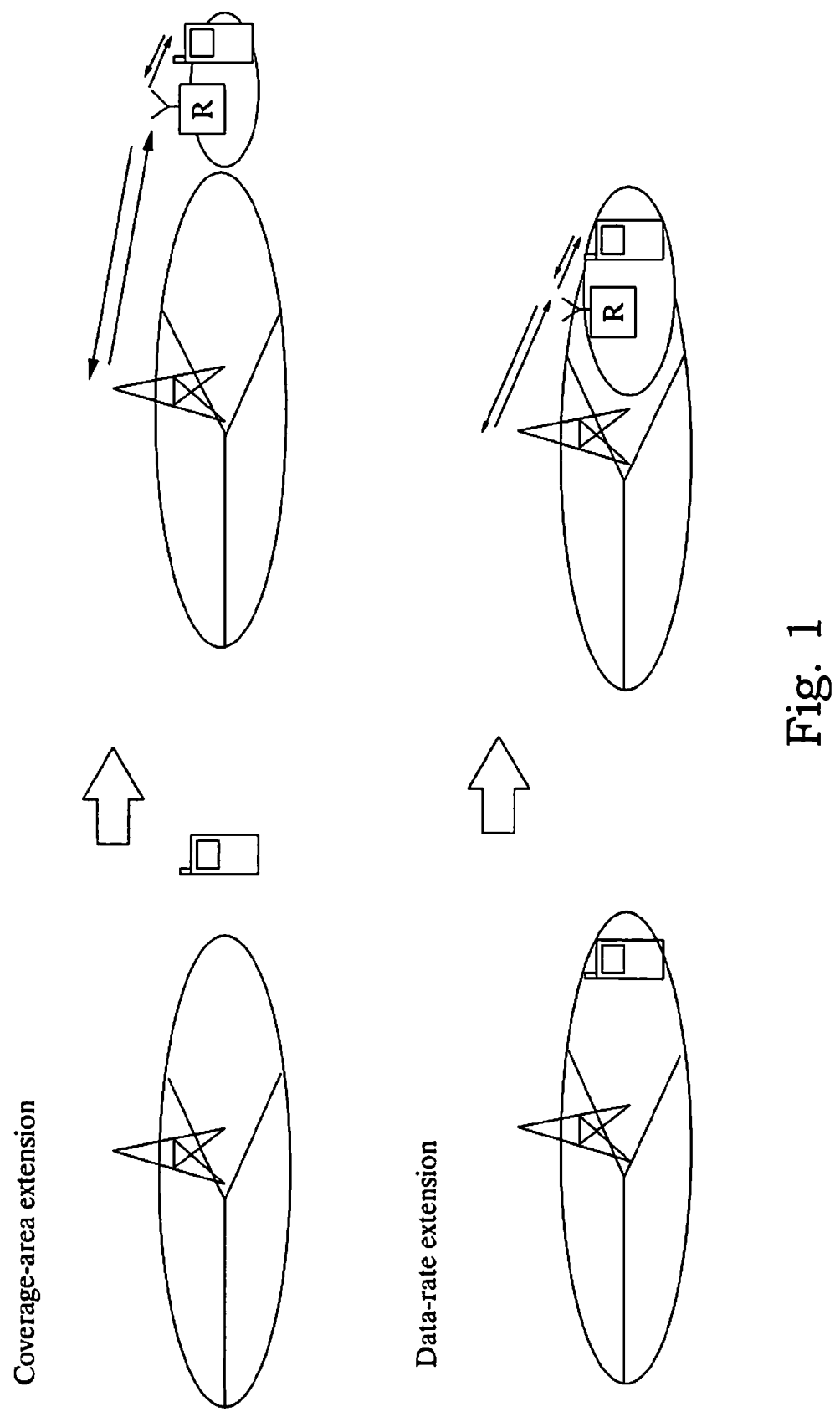
FIG. 1 is a in illustration of the impact of repeaters and relays to improve coverage in a telecommunication system.

The present invention will be described in the context of a LTE system; however, it is equally applicable to similar systems utilizing repeaters or repeater nodes.

To further illustrate the disadvantages of using AF repeaters, some additional problems will be described below. In addition, some specifics relating to control signaling in LTE will be described with relation to the problems solved by the present invention.

Solutions based on conventional repeaters, as they are described in the background have several shortcomings that need to be overcome to enable a more efficient use of repeaters in telecommunication systems, especially for LTE Advanced systems.

These disadvantages include:

Interference problems: For a given user some repeaters may contribute with more interference than signal. Typically, it is desirable to avoid moving the low SNR from the cell edge into the cell center when there is no active cell edge user.

Repeater cross-couplings may cause instability: In case a large number of repeaters are deployed in a small area the repeaters will interfere with each other. By determining the repeater cross couplings it is possible to allow certain repeaters to operate with much larger gain than what would have been otherwise possible if it is known that repeaters with strong cross-coupling are currently not active.

Energy consumption: Conventional repeaters are always on, even when no data is transmitted. Significant energy consumption savings are enabled by introducing the possibility to turn repeaters on and off from the network.

Power regulation issues for uplink power control: LTE supports methods to control the uplink inter-cell interference by means of uplink power control with fractional path loss compensation. In order not to destroy these advantages of LTE when deploying repeaters it is necessary to be able to control the gain of the repeaters because that directly determines the UE transmit power that causes the uplink inter-cell interference.

There are also other potential for improved performance with more advanced repeater behavior e.g. by dynamically selecting if the repeater should operate in on-frequency mode or frequency translating mode on the uplink it is possible to trade the bandwidth gain of the on-frequency operation versus the diversity gain and self-interference avoidance of the frequency translating relaying (FTR) operation. This FTR technique will however not work well for legacy UEs since the decoding of the resource allocation on the PDCCH will not indicate where the actual translation is performed. To make FTR work for the LTE downlink the repeater would need to only apply frequency translation to the data parts and not the control parts of the downlink resource space. Furthermore, the eNB would need to compensate for the frequency shift already on the PDCCH. Even though FTR is an interesting technique, the problems with backwards compatibility together with the duplex loss that comes with FTR, makes it less interesting for advanced repeaters in LTE and LTE-A.

A conventional non-controllable repeater is a rather simple device that continuously amplifies and forwards the signal it receives, regardless if that signal contains a useful data signal or not. Typically, the repeater gain of a conventional repeater is set up during installation and is after that not changed during the lifetime of the repeater.

More advanced repeaters can be controlled more dynamically from the network. More specifically, the serving node—typically a radio base station—may use dedicated control signaling towards the repeater to control its behavior. In this case, a repeater is typically associated by the radio base station with a group of terminals that would benefit from signal repetition. The radio base station then controls the advanced repeater so that it repeats the time and frequency resources assigned to or used by the associated user terminals.

In a typical setup a repeater periodically receives (e.g. every transmission time interval (TTI) or every $n^{th}$ TTI or event triggered) via the control signaling from the serving node a command to amplify and forward a specific Downlink (DL) or Uplink (UL) radio resources.

The repeater control command could include information about which resources to amplify; what average gain the repeater shall use; the individual gain for each radio resource forwarded by the repeater. The more advanced the repeater becomes the larger also the amount of required control signaling becomes.

One possible realization of the control signaling between serving node and repeater is to treat the repeater like a terminal. Each repeater gets a "terminal" identity and control signaling towards the repeater uses normal serving node terminal communication.

In LTE DL assignments and UL grants are sent to a user terminal via the Physical Downlink Control Channel (PDCCH). This channel resides within the first one, two or three OFDM symbols of a subframe. DL assignments received in a subframe are valid for this subframe whereas an UL grant is valid for the UL subframe that comes four TTI later. The payload of the PDCCH contains the Downlink Control Information (DCI)—which typically contains either a DL assignment or an UL grant—and a Cyclic Redundancy Check (CRC).

Depending on the configured transmission mode of the terminal, the DCI for the terminal has a specific size. Each terminal tries to decode PDCCH with a few different DCI sizes. Depending on the channel conditions, different coding of the DCI is required, so one DCI can actually be represented by differently large PDCCH. In total, each terminal has to blindly decode up to 44 PDCCH candidates. The PDCCH does not contain a direct address field that identifies the terminal the PDCCH is for. Instead the attached CRC is scrambled by a mask that depends on the Cell Radio Network Temporary Identifier (CRNTI) of the terminal. The CRC serves two purposes, to make sure a PDCCH has been correctly decoded and to address the terminal.

To summarize the PDCCH decoding process in the terminal: A terminal tries to decode PDCCH with multiple sizes, in total up to 44 blind decodings are required. After a terminal has decoded a DCI it calculates the CRC, scrambles the CRC with a mask that depends on its CRNTI and compares the results with the CRC contained in the PDCCH. In case of a match, the terminal knows the decoded DCI is addressed for it. Typically, the DCI message will contain a DL assignment or an UL grant. This blind decoding process must be finished quickly since DL assignments are valid for the current subframe.

Most of today's employed repeaters are not controllable. Typically, a repeater is set up during the deployment phase and then left unchanged. More advanced repeaters are controllable where dedicated control signaling between the serving node and the repeater is used. However, this dedicated signaling uses capacity of the air interface.

It is an objective of the present invention to minimize the amount of dedicated control signaling that needs to be sent over the air from the radio base station to the repeater.

Figure 2:
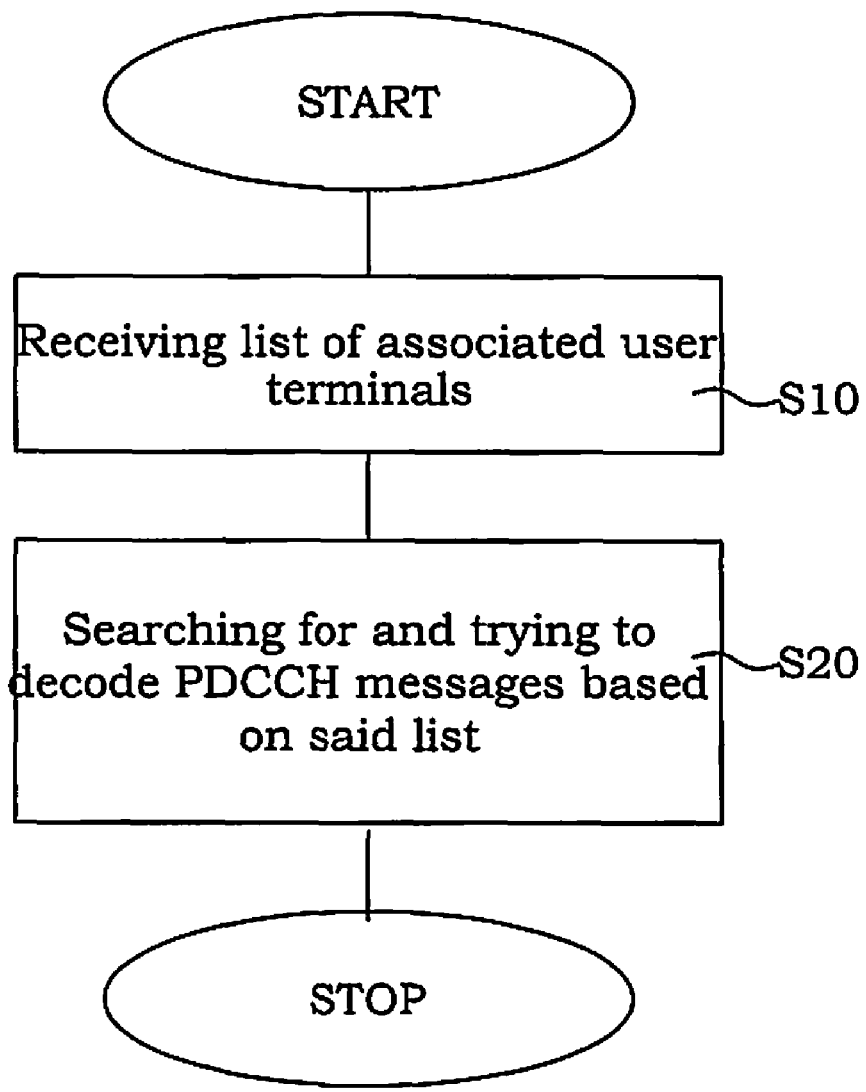
FIG. 2 is a schematic flow chart of an embodiment of a method according to the present invention.

With reference to FIG. 2 a basic embodiment of the present invention will be described. Consider a system with a radio base station, at least one controllable repeater node and a plurality of user terminals potentially associated with the controllable repeater. At any given point in time both the radio base station and the controllable repeater need to be aware of which user terminals are associated with the repeater. According to the invention, the radio base station transmits a list of the user terminal identities e.g. CRNTI associated with the controllable repeater. The list is received by the controllable repeater S10. Subsequently, the repeater searches and tries to decode S20 downlink channel control messages based on the list. In other words, the list provides a guide on which messages in the downlink control channel to try to decode, amplify and forward.

According to a further embodiment, the controllable repeater configures downlink repeater gain and uplink repeater gain in correspondence with the found and decoded control messages for its associated user terminals.

Figure 3:
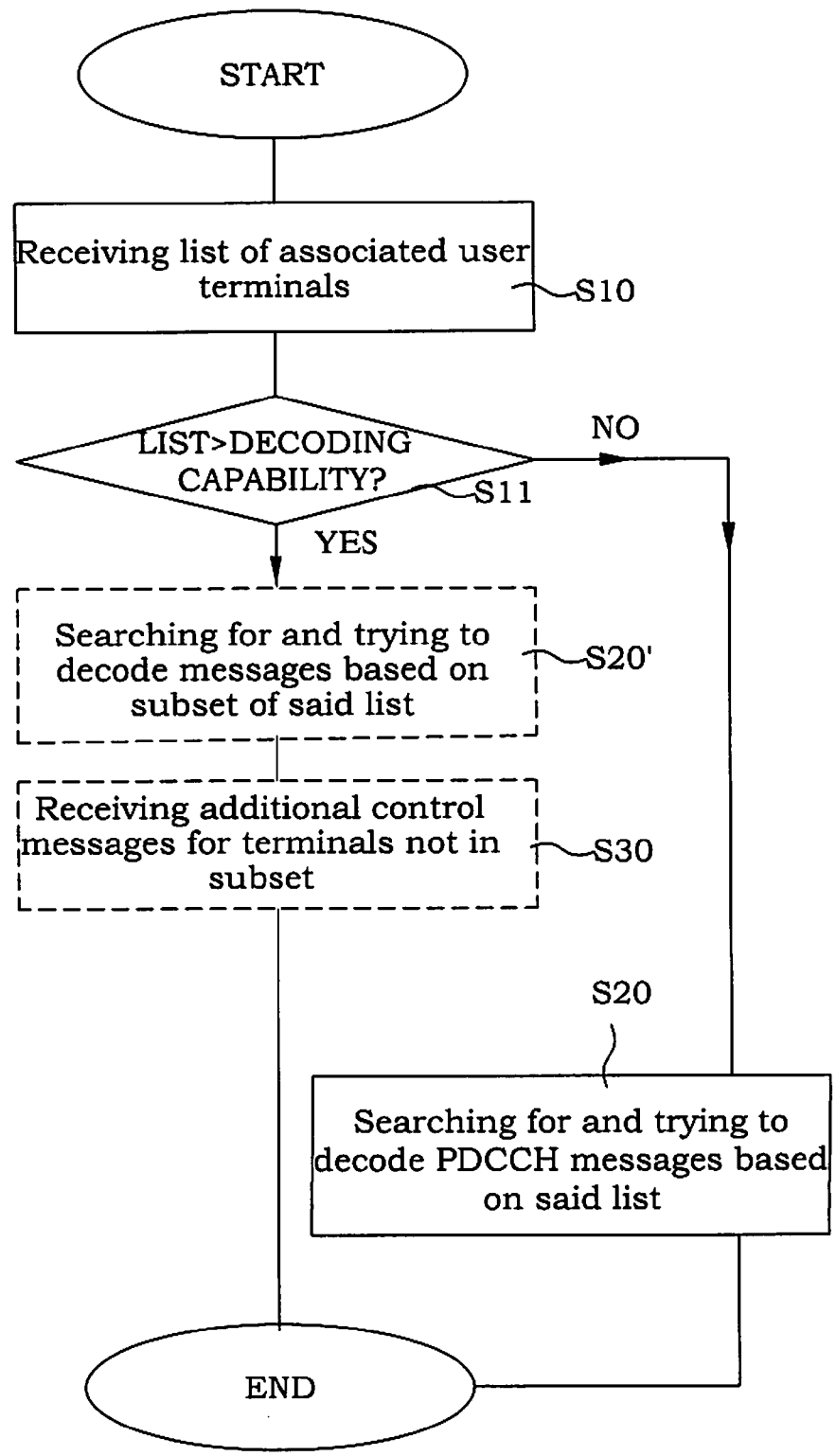
FIG. 3 is a further embodiment of a method according to the present invention.

However, typically the repeater has a limited capability of decoding channels, e.g. the number of control messages it can decode blindly. Consequently, at some point in time the list of associated user terminals might exceed the upper decoding capability of the controllable repeater. This is, with reference to FIG. 3, revealed in a control step S11 (either at the radio base station, the repeater or both). In response to a determined excess of associated user terminals, the repeater instead performs searching and decoding of control messages S20' based on a selected subset of its associated user terminals. Additional control information for scheduled user terminals not part of the subset is provided S30, preferably utilizing a dedicated reserved identifier in the list.

The invention and the benefits thereof will be described with reference to a specific example scenario below.

Figure 4:
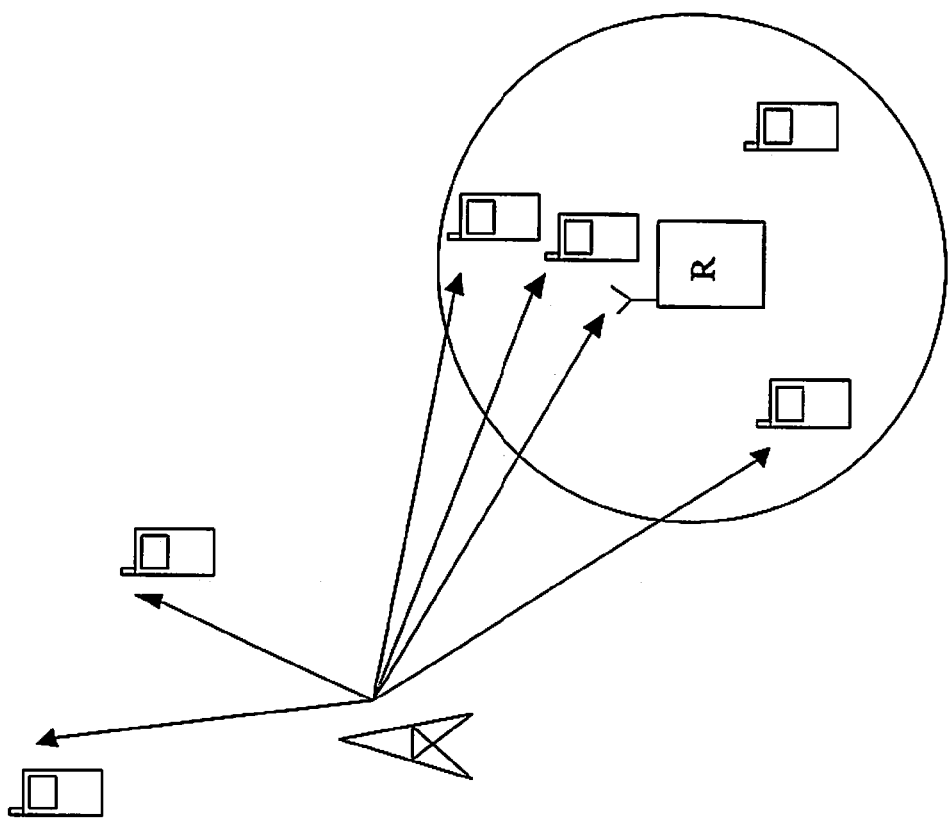
FIG. 4 illustrates a system in which the present invention can be implemented.
Figure 5:
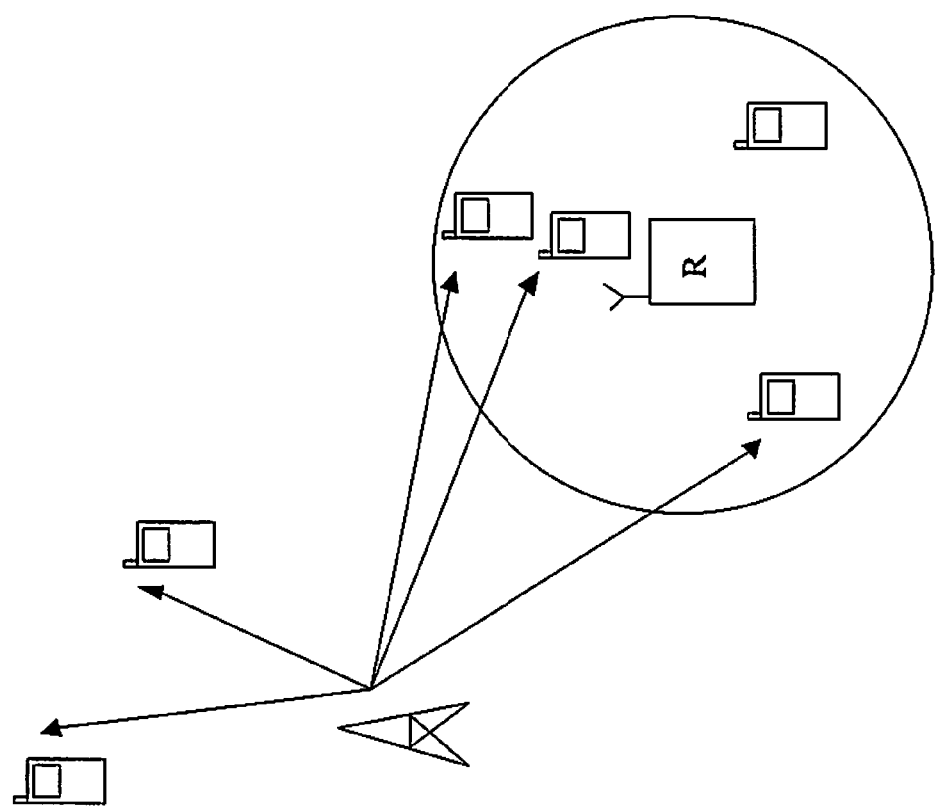
FIG. 5 illustrates a system in which the present invention can be implemented.

With reference to FIG. 4 and FIG. 5, a repeater is associated with N terminals. The repeater has its own dedicated control signaling. UEs in the circle (indicating the signaling range of the repeater) are associated with the repeater. Arrows indicate control signaling directed either to UEs or to the repeater. The repeater decodes the control channels directed to the terminals associated with the repeater. In LTE this involves performing up to 44 blind decoding attempts per terminal, a repeater associated with many terminals needs therefore powerful hardware to accomplish this task. However, most of the time a repeater is only associated with a few terminals and most of the decoder hardware in the repeater would idle. It is therefore proposed that a repeater is designed to be able to decode the control channels of a typical number of terminals. If this number is exceeded then the serving node—which is aware of the processing capability of the repeater—sends control messages directly to the repeater.

Thus, the repeater tries to decode PDCCH that are addressed to any of the terminals currently associated with the repeater. To be able to do so the repeater needs to know which terminals are currently associated with it, therefore it needs to be configured by the serving node e.g. radio base station. This configuration still occurs via dedicated control signaling. However, changes in the terminal population associated with the repeater are not very frequent and therefore dedicated signaling is no problem. To enable this dedicated signaling the repeater has its own CRNTI and is treated by the serving node like a terminal.

If a repeater is associated with N terminals it must be capable to perform N×44 blind decodings. If a repeater would be designed to be capable to decode control channels corresponding to the maximum possible number of terminals that may be associated with the repeater it would have to have quite powerful hardware to perform these blind decodings in time. However, most of the time a repeater is only associated with far less terminals. It is therefore proposed that a repeater is capable to blindly decode PDCCH of a typically small number of terminals.

Figure 6:
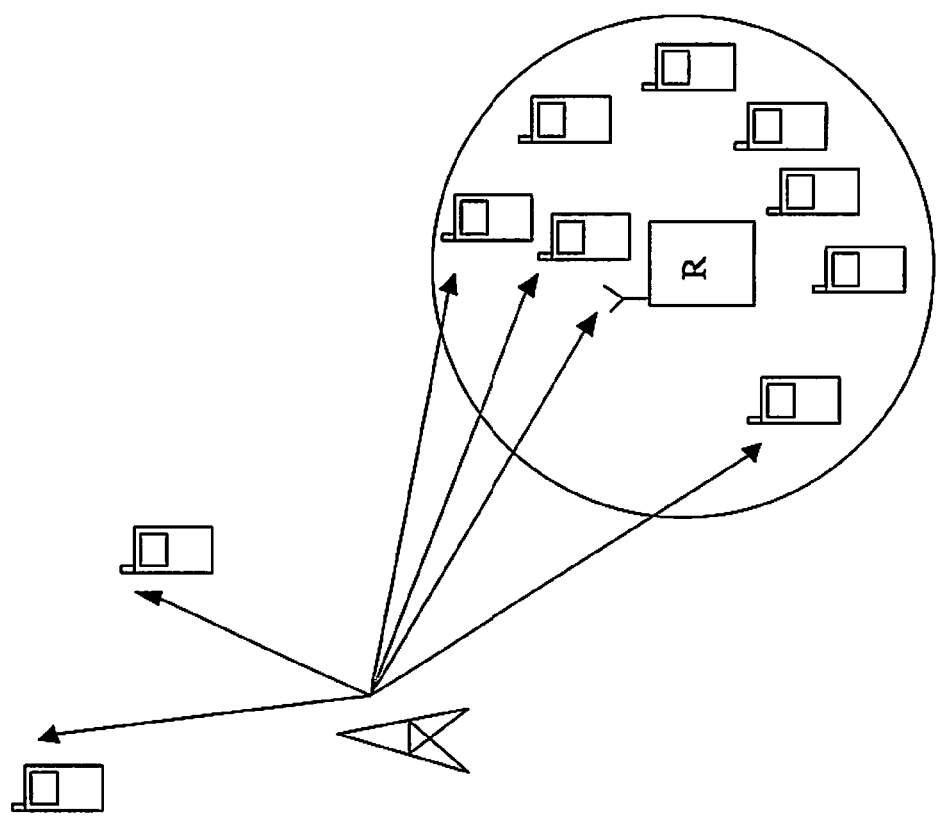
FIG. 6 is a illustrates a system in which the present invention can be implemented.

In case a repeater, with reference to FIG. 6, is associated with more terminals than it can blindly decode the repeater does not blindly decode all terminals (which it is anyway not capable of) but only a subgroup. The size of this subgroup is typically by one or two smaller than the maximum blind decoding capacity of the repeater. If a repeater is capable to blindly decode N terminals, it would only try to decode N−1 (N−2) terminals. The remaining capacity is used to decode repeater specific control signaling. Since the serving node is aware of the decoding capability of the repeater (exchanged with the serving node during setup procedure of repeater) it would insert dedicated repeater control signaling regarding the scheduled terminals the repeater will not try to decode. Both the serving node and the repeater must have a common understanding which terminals are blindly decoded by the repeater and which are not. Consequently, according to a specific embodiment, the terminals of the associated list need to be sorted to enable a selection of a subset to blindly decode. Typically, the sorting takes place in both the controllable repeater and the radio base station, or in one of the two. However, both devices need to be aware of which sorting algorithm or condition that is to be used.

In the simplest case, the terminals associated with the repeater are sorted according to their CRNTI in increasing (decreasing) order and the repeater tries to decode the first N−1 (N−2) terminals in this list. Control information for scheduled terminals outside this list are communicated to the repeater directly. More advanced schemes could include dynamic sorting of this list according to the activity level of terminals. Here the repeater tries to decode the N−1 (N−2) most active terminals, whereas scheduling information regarding the other terminals is communicated to the repeater via serving node repeater communication. Since this information only contains scheduled terminals this approach minimized the additional control signaling because the repeater blindly decodes control messages for the most active terminals. However, for this method to work the sorting of associated terminals changes and the repeater must be informed about these updates. Updating the repeater is done via serving node repeater communication which increases overhead.

In case of non-frequency selective repeaters this additional control information can be further minimized. If at least one of the terminals that are blindly decoded by the repeater is currently scheduled no additional information regarding any other terminal needs to be communicated to the repeater. As soon as one terminal currently associated with the repeater is scheduled, the repeater will amplify and forward the complete received signal (it is a non-frequency-selective repeater) thus automatically amplifying other terminal signals as well. In case none of the blindly decoded terminals is currently scheduled, the dedicated control signaling between serving node and repeater needs only to contain information regarding one scheduled terminal since then the complete received signal will be amplified.

This applies separately for DL and UL, i.e. a terminal scheduled in the DL does not count for the UL and vice versa.

For the DL the dedicated repeater control DCI can be any kind of DL assignment. Since the DL assignment is valid for the current subframe the repeater has no time to decode the payload of DL assignments. All required information must be contained in the repeater control DCI itself. In case of a non-frequency-selective repeater any DL assignment works (as soon as any DL assignment is indicated the repeater amplifies the complete DL signal). The resources addressed by the DL assignment can either be reused by a terminal (the resources pointed out by the repeater control DCI are not used for the repeater but by a terminal) or can be used to signal repeater control information or information about the coming UL grants to the repeater (if needed).

For the UL any repeater control DCI with an UL grant works. Again, since the repeater is non-frequency-selective the complete UL signal will be amplified as soon as a single UL grant is indicated. The resources pointed out by the UL grant can either be reused by a terminal or can be used for uplink transmission from the repeater to the base station.

The repeater on the other side can stop to blindly decode PDCCH as soon as it found one scheduling assignment since it will amplify the complete received signal (it is a non-frequency-selective repeater). This enables power savings in the repeater.

A similar approach can also be taken for frequency selective repeaters: The dedicated serving node repeater information has only to include one terminal per sub-band. As soon as one terminal is scheduled within a sub-band the repeater will amplify this sub-band. In this context the term sub-band is used to denote the bandwidth of each band-pass filter in the frequency selective repeater. This implies for the DL that the resources indicated by the repeater control DCI1 must at least contain a single RB in each sub-band occupied by terminals that are not blindly decoded by the repeater.

The same also applies for the UL. However, in Rel-8 of LTE only DCI formats for contiguous resource allocations are defined. To mitigate this problem two possible solutions can be envisioned: 1) The indicated repeater control UL grant is contiguous and covers those sub-bands that are occupied by terminals which are not blindly decoded by the repeater. Unused sub-bands in-between allocated sub-bands are also amplified. 2) Repeater control signaling via PDSCH is used. This transmission must occur earlier than the current subframe to give the repeater time to decode PDSCH. One possibility is to use the same subframe where the UL grants were transmitted. The CRNTI used for this repeater control DC12 containing the repeater control DL assignment is typically different from the CRNTI of repeater control DCI1 (reuse of the resources pointed out by DCI1 is only possible in very special cases).

Each UL grant contains an UL power control command which is used by the terminals to adjust their UL transmission power. However, in a network with repeaters these UL power control commands are also used by the repeater to calculate the optimal gain setting. The repeater control DCI with the (single) UL grant however fits only a single UL power control command. This UL power control command must be set to a value which enables the repeater to still calculate its UL gain. For an LTE Rel-10 system, this problem is somewhat mitigated since here non-contiguous resource allocation are also supported in the uplink.

Alternatively, the repeater is designed to perform a certain number of blind decoding attempts in a pre-defined order that is known by the scheduling eNB. Thus in case a repeater serves N terminals it needs to perform 44×N blind decoding attempts in the worst case. However, a repeater that is only capable of performing M (<<44×N) control channel decoding attempts could actually detect up to M control channel messages if the scheduling base station places the control channel allocations directed to the M terminals served by the repeater on the M first PDCCH candidates that the repeater will try to decode.

Thus, in order to decode the PDCCH information targeting e.g. 5 terminals we do not need to have a repeater that is capable of performing 220 (44×5) blind PDCCH decoding attempts. A repeater that can only perform e.g. 10 PDCCH decoding attempts would at least theoretically be able to find all relevant PDCCH allocations (uplink grants and downlink allocations) in case the scheduling base station have placed the corresponding control channel messages on exactly the 10 PDCCH candidates that the repeater tries to decode. However, in that case the base station scheduler will have very little freedom when mapping the downlink control information (DCI) on to the physical downlink control channel (PDCCH). Even though this example is a bit extreme it clearly shows that it is possible to limit the number of blind decoding attempts performed in the repeater by putting restrictions on the DCI mapping on the PDCCH. One example of such a restriction is that e.g. only PDCCH allocations of certain sizes can be used in case a terminal is served by a repeater.

In a closed subscriber group, not any terminal is allowed to be associated with a repeater but only those ones with permission. A typical example would be a home repeater where only terminals associated with this home are allowed to use this repeater. A simple way to create such a closed subscriber group is to associate a repeater only with those terminals that are allowed to connect to the repeater. The repeater will then obtain control signaling addressed to all of these terminals (either blindly decode or receive via serving node repeater information) and amplifies all DL and UL transmissions targeting any of the allowed terminals.

Figure 7:
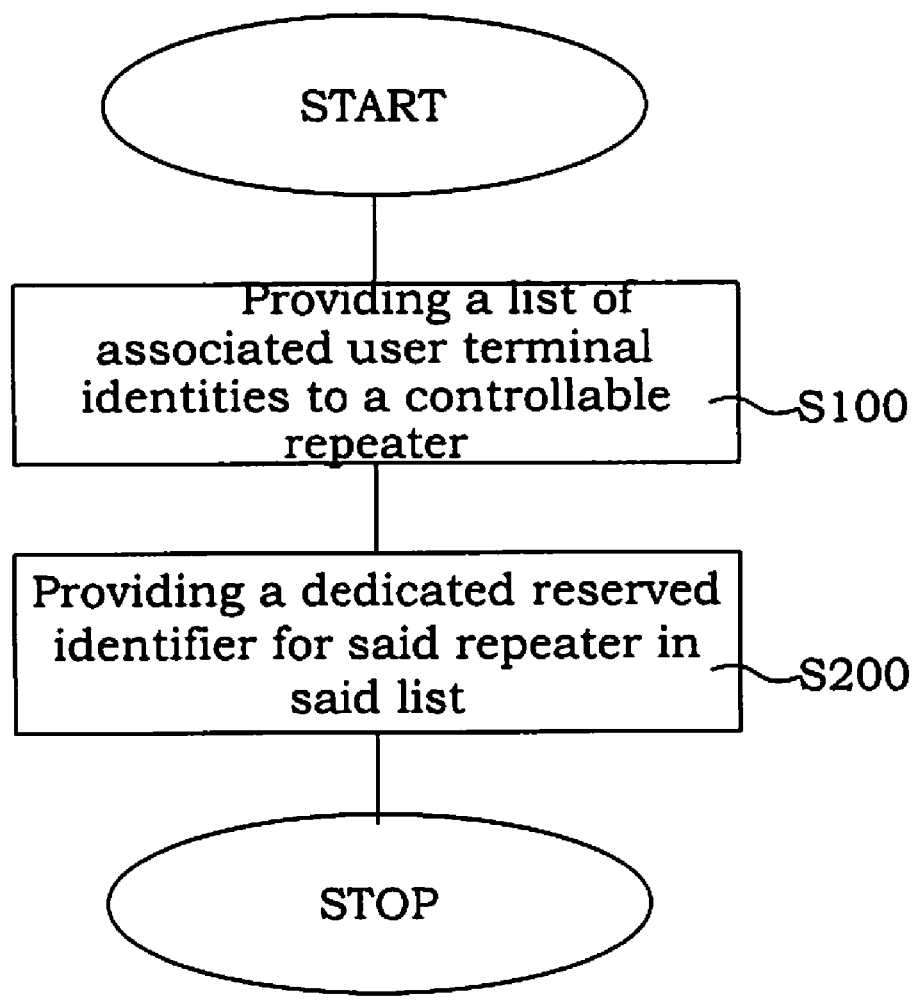
FIG. 7 is a schematic flow-chart of an embodiment of a method in a radio base station according to the present invention.

With reference to FIG. 7, a method in a radio base station according to the present invention will be described. A radio base station provides S100 a list of user terminal identities associated with a controllable repeater to the repeater, additionally the radio base station provides S200 a dedicated reserved identifier in the list. The identifier is not used by any associated terminal, but is reserved to provide additional control information if needed.

Figure 8:
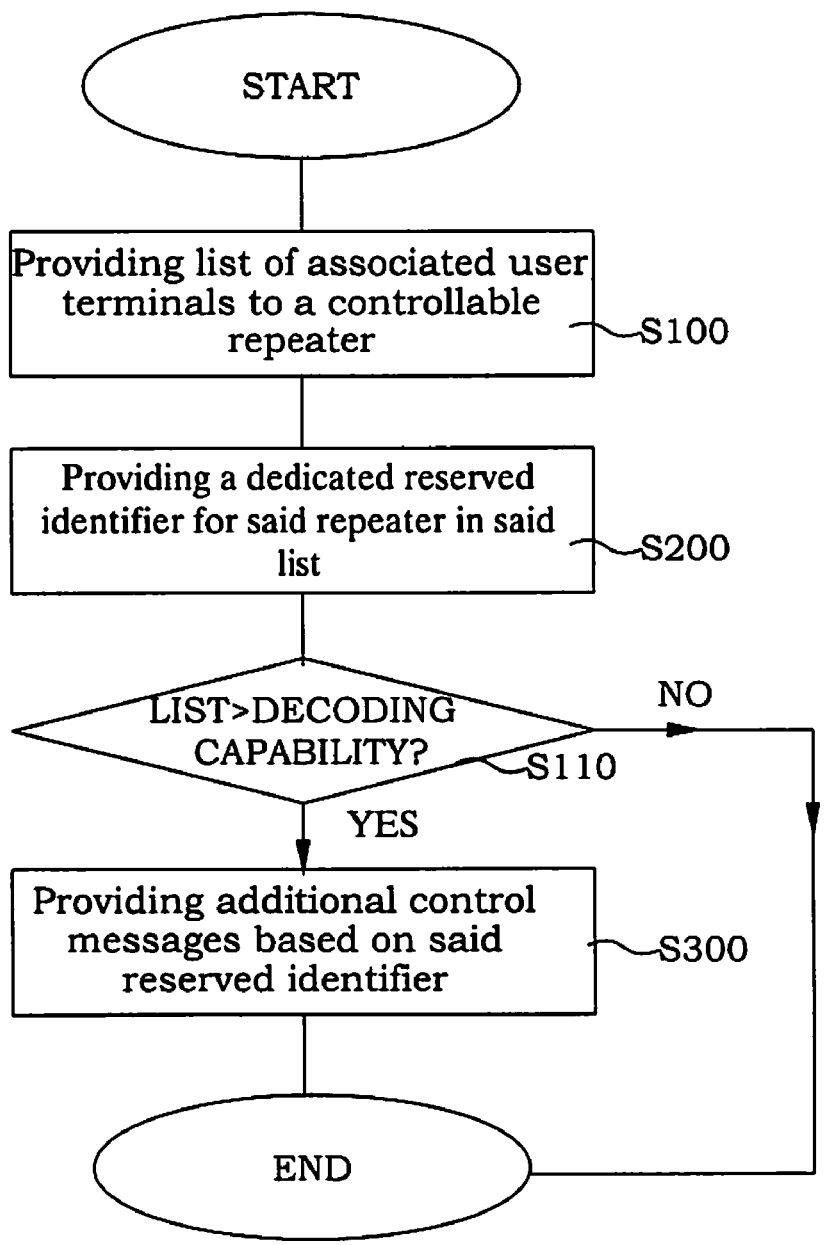
FIG. 8 is a schematic flow-chart of a further embodiment of a method in a radio base station according to the present invention.

With reference to FIG. 8, if the radio base station determines S110 that the number of terminals associated with the controllable repeater exceeds a decoding capability of the repeater and terminals currently scheduled are outside the subset of terminal identities which the repeater tries to decode blindly, additional control information for those user terminals in excess of the decoding capability is provided S300 based on the reserved identifier.

Figure 9:
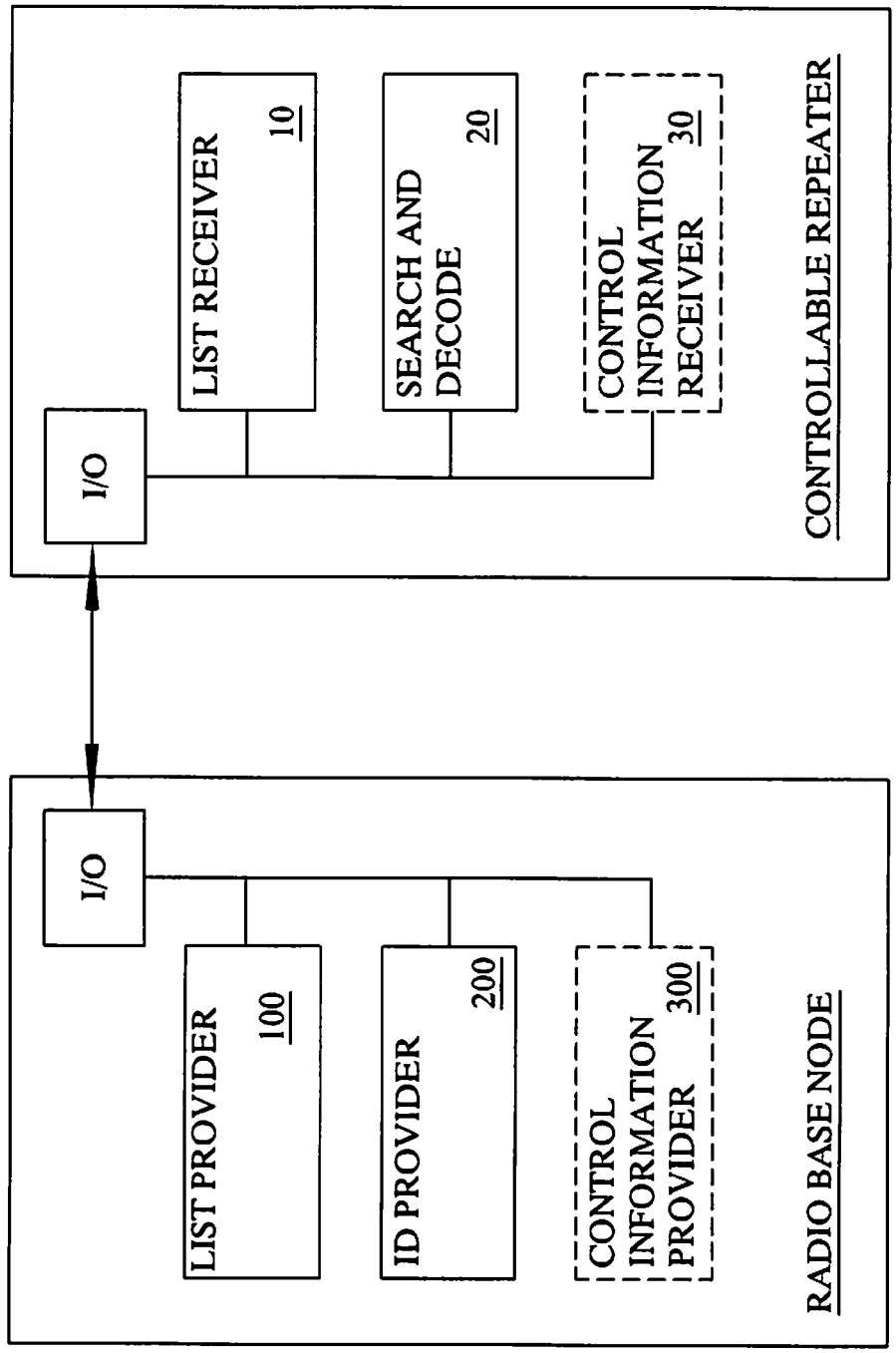
FIG. 9 is a schematic illustration of arrangements according to the present invention.

With reference to FIG. 9, embodiments of arrangements for implementing the method according to the present invention will be described.

A controllable relay or repeater node 1 according to the present invention comprises a generic input/output unit I/O for receiving and transmitting signals in a known manner. Other functional units, such as amplifying arrangements and other signal-managing units are not disclosed, but are assumed to be well known in the technical field. The repeater 1 further comprises a list receiving unit 10, adapted for receiving a list of user terminal identifiers or identities for user terminals associated with the repeater 1. Preferably, the identifiers are referred to as CRNTI for each user terminal. In addition, the repeater node 1 includes a search and decoding unit 20, adapted for searching for and decoding downlink channel control messages (PDCCH) based on the provided list. In other words, the unit 20 searches for and tries to decode control messages for user terminals as identified in said list.

According to a further embodiment, the repeater node 1 is further configured to determine if the number of associated user terminals exceeds a predetermined decoding capability threshold for the repeater. This functionality is either a separate unit in the repeater node, or part of the search and decoding unit or some other section of the repeater node hardware.

According to yet another embodiment, the repeater node 1 comprises a control information unit 30 configured to receive additional control information if the decoding capability threshold is exceeded by the list. This additional control information is received based on a dedicated reserved identifier provided in the list of associated user terminals for the repeater.

In addition, the embodiments of the repeater node are adapted to implement the method according to the description.

Also with reference to FIG. 9, a radio base station arrangement or node according to the present invention will be described. According to the present invention the radio base station comprises a generic input/output unit I/O for receiving and transmitting signals in a known manner. In addition, the radio base station comprises a list providing unit 100, configured to provide a list of associated user terminals to a controllable repeater. In addition, the radio base station comprises a unit 200 for providing a dedicated reserved identifier for the controllable repeater in the list of associated user terminals.

According to a specific embodiment, the radio base station further comprises unit 110 for determining if the number of associated user terminals for the repeater exceeds a predetermined decoding capability threshold for the repeater. This functionality is either a separate unit in the radio base station, or part of the list providing unit 100 or some other section of the radio base station hardware.

According to a further embodiment, the radio base station is configured with a control information unit 300 adapted to provide additional control information based on the aforementioned dedicated reserved identifier for the repeater.

Figure 10A:
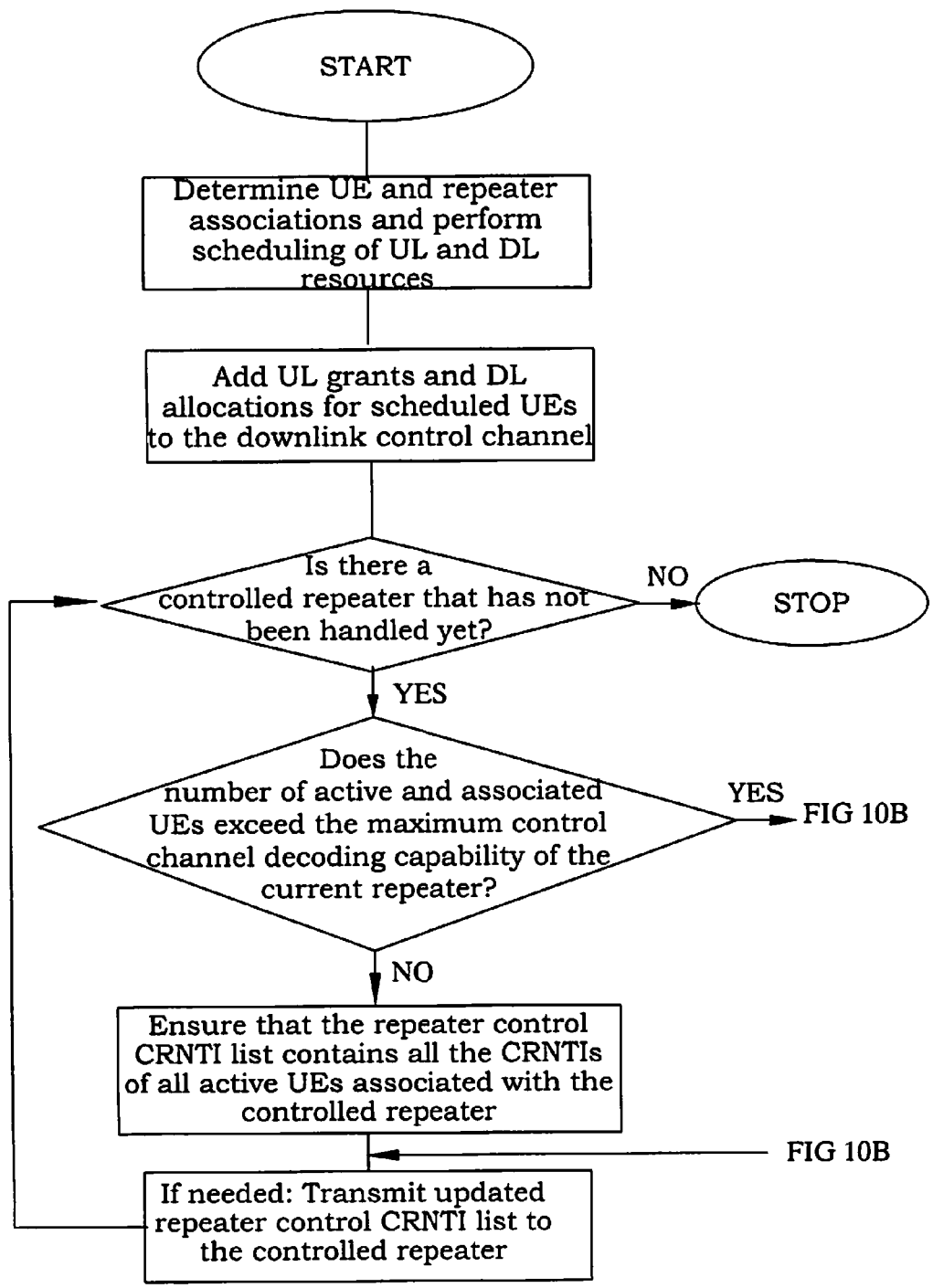
FIG. 10A is a schematic flow-chart of an embodiment of a method in a radio base station according to the present invention.

With reference to FIGS. 10A and 10B, a method in a radio base station according to the present invention will be described. Initially associations of user terminals and repeaters are determined and uplink and downlink resources are scheduled accordingly. Uplink grants and downlink allocations for scheduled user terminals are added to a downlink control channel for the radio base station. Subsequently, a check is performed to determine if there are any controlled repeaters in the system that have not been handled. If that is the case, for that controlled repeater, a comparison between a number of active and associated user terminals for that repeater exceed a maximum control channel decoding capability for the controlled repeater.

If the number of active and associated users does not exceed the maximum capability, a further check is performed to ensure that the repeater CRNTI list contains the IDS for all active user terminals associated with the repeater. If needed, an updated repeater control CRNTI list is transmitted to the repeater.

If the number of active and associated users exceeds the maximum decoding capability, the radio base station ensures that the CRNTI list of the repeater contains dedicated CRNTI not used by any of the associated user terminals. If needed the radio base station performs one or more of the following steps. 1) generates an uplink gain control command for the repeater in dependence of all uplink grants directed to active user terminals associated with the repeater that the repeater is unable to decode; 2) generate a downlink gain control command for the repeater in dependence of all downlink allocations directed to the user terminals associated with the repeater that the repeater is not capable of decoding; and finally 3) adding the uplink and/or downlink repeater gain control commands to the downlink control channel using the dedicated CRNTI in the repeater control CRNTI list.

Figure 11:
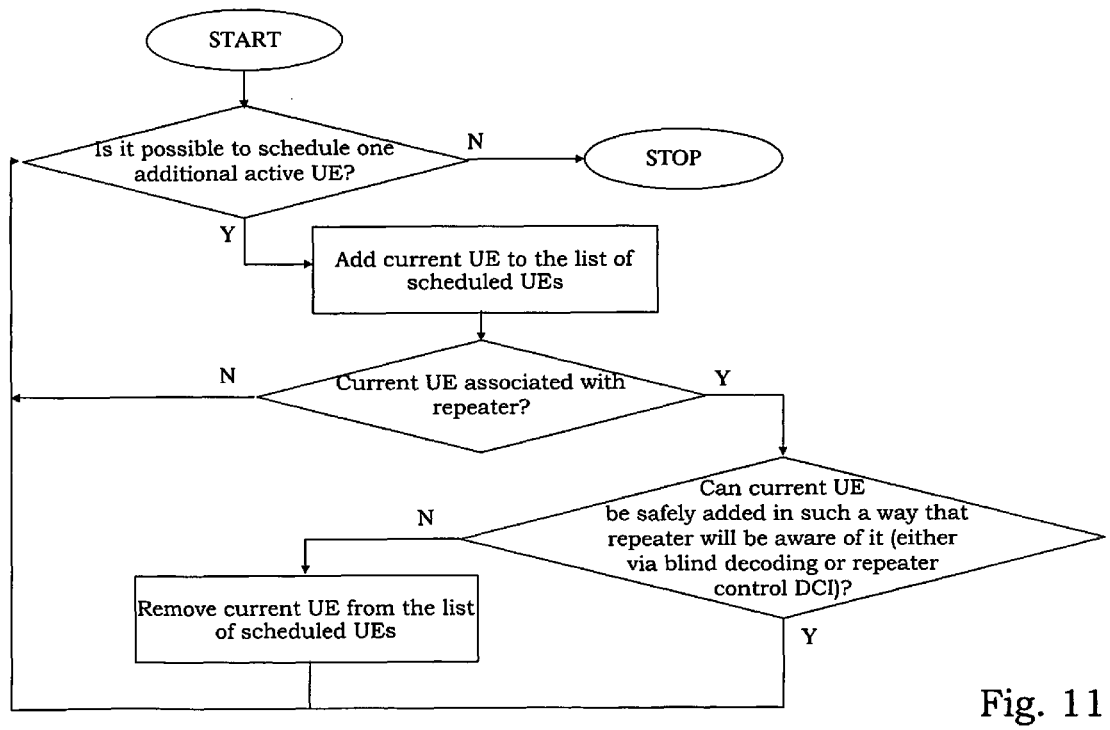
FIG. 11 is a schematic flow-chart of an embodiment of a method in a scheduling entity according to the present invention.

With reference to FIG. 11, a method in a scheduler according to the present invention will be described. Initially, a control is performed to see if it is possible to schedule any additional user terminals to a repeater. If such is the case, the user terminal identifier is added to the list of scheduled user terminals, otherwise the scheduling is stopped. Subsequently, the scheduler determines if the current user terminal (the one added to the list) is associated with the controllable repeater. If such is the case, a check is performed to determined if the user terminal can be added to the list of associated user terminals safely. Safely in this context indicates that the user terminal can be added to the list of associated user terminals in such a manner that the repeater is aware of it, either as via blind decoding as part of a selected subset for decoding, or via dedicated control signaling on the PDCCH using a dedicated reserved identifier. Some of the steps that can be performed in order to determine if the user terminal can be safely added are:

Checking if the number of active and associated user terminals will exceed the maximum control channel decoding capability of the repeater;

if needed, checking if any user terminal in the repeater control list is assigned an UL grant;

if needed, checking if it is possible to reserve a control channel resource for UL repeater gain control;

if needed, checking if any user terminal in the repeater control list is assigned a DL allocation;

if needed, checking if it is possible to reserve a control channel resource for DL repeater gain control;

checking if the repeater control CRNTI list needs to be updated because of this and if that is possible in the current TTI.

Figure 12:
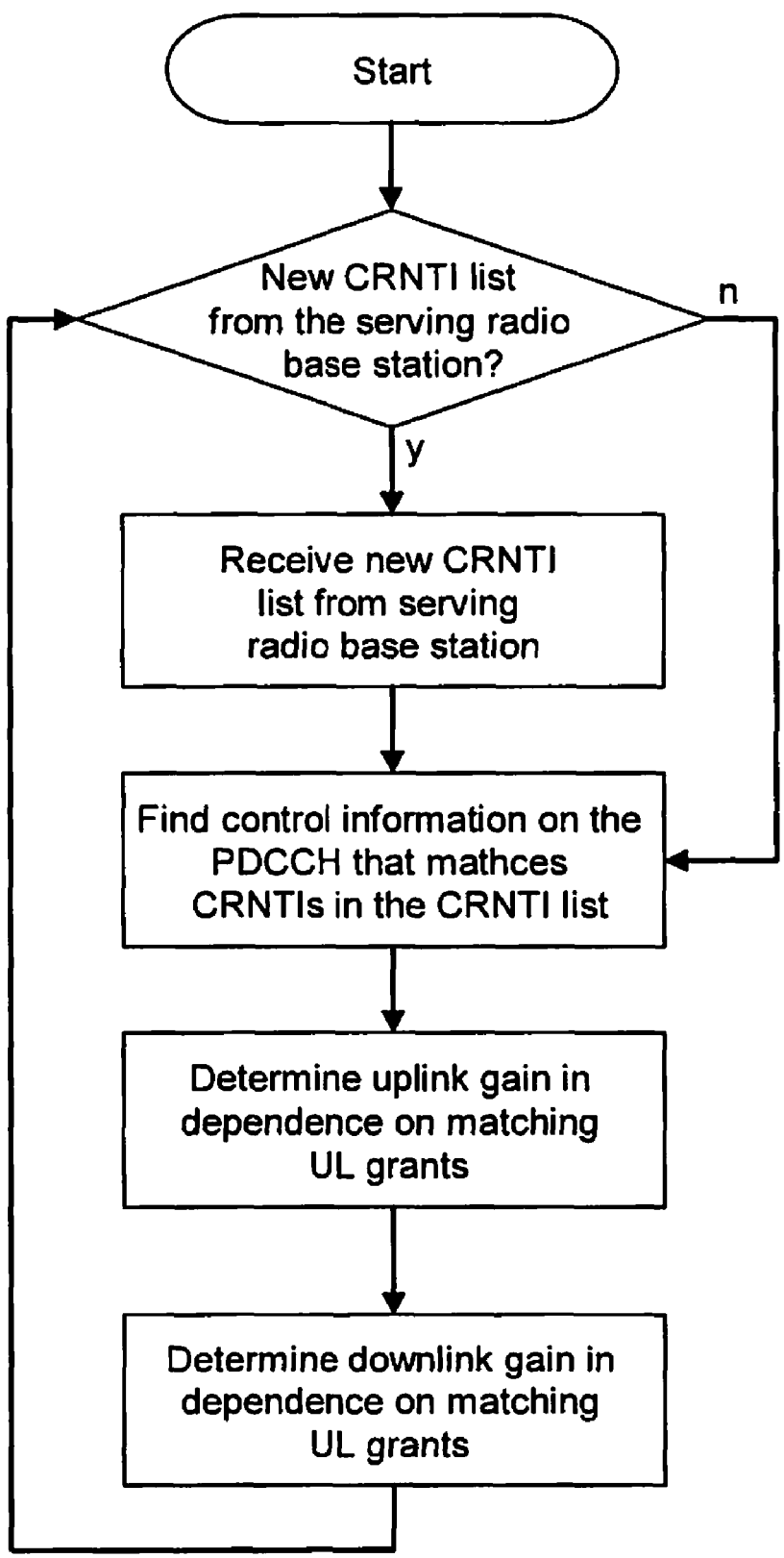
FIG. 12 is a schematic flow chart of an embodiment of a method in a repeater according to the present invention.

With reference to FIG. 12 a method in a repeater according to the present invention will be described. Initially a new CRNTI list is provided at a radio base station. The list is subsequently transmitted to and received at a repeater. Detecting control information on the PDCCH that matches CRNTIs in the provided CRNTI list. Uplink and/or downlink gain is determined in dependence of matching uplink grants.

Advantages of the present invention include enabling a dedicated serving node repeater communication, which off-loads the air interface. It also enables a compromise in repeater complexity and overhead required for repeater control. The method according to the invention enables a simple way of constructing closed subscriber groups for repeaters without involving higher layer processing.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

What is claimed:

1. A method in a controllable repeater in a telecommunication system having at least one radio base station, comprising the steps of:
  receiving a list of associated user terminal identities for said repeater;
  determining if the number of associated user terminals in said list exceeds a predetermined decoding capability threshold for said repeater, and:
    if not, searching for and trying to decode downlink channel control messages based on said list;
    if so, searching for and trying to decode downlink channel control messages based on at least a selected subset of said associated user terminals, and trying to receive dedicated control information from said radio base station for associated user terminals outside said subset;
  wherein the step of searching for and trying to decode downlink channel control messages comprises searching for and decoding downlink channel control messages for at least N−2 of said associated user terminals, where N is the predetermined decoding capability threshold.

2. The method according to claim 1, further comprising the step of configuring a downlink repeater gain in dependence of matching downlink allocations.

3. The method according to claim 1, further comprising the step of configuring an uplink repeater gain in dependence on matching uplink grants.

4. The method according to claim 1, further comprising the steps of receiving and adding a reserved identifier to said list, said reserved identifier not being associated with a terminal in said list.

5. The method according to claim 4, wherein the step of trying to receive said dedicated control information is based on said reserved identifier in said list.

6. The method according to claim 5, further comprising the steps of receiving an additional repeater uplink gain adjustment calculated in dependence on uplink grants to users associated with the repeater that the repeater was not able to decode.

7. The method according to claim 5, further comprising the steps of receiving an additional repeater downlink gain adjustment calculated in dependence on downlink allocations to users associated with the repeater that the repeater was not capable of decoding.

8. The method according to claim 1, further comprising the steps of sorting said list of associated user terminals based on their provided identity and selecting said subset based on the sorted list.

9. The method according to claim 8, wherein said step of sorting said list of associated user terminals is based on a respective activity level of each terminal, and said subset is selected to comprise the terminals with the highest activity level.

10. The method according to claim 8, wherein said sorting comprises receiving an updated or sorted list.

11. The method according to claim 1, further comprising discontinuing said step of searching and trying to decode downlink channel control messages when at least one downlink channel control message has been decoded.

* * * * *

UNITED STATES PATENT AND TRADEMARK OFFICE
CERTIFICATE OF CORRECTION

| | |
|---|---|
| PATENT NO. | : 8,385,264 B2 |
| APPLICATION NO. | : 12/579818 |
| DATED | : February 26, 2013 |
| INVENTOR(S) | : Baldemair et al. |

It is certified that error appears in the above-identified patent and that said Letters Patent is hereby corrected as shown below:

In the Specification

In Column 8, Line 66, delete "DC12" and insert -- DCI2 --, therefor.

Signed and Sealed this
Eleventh Day of June, 2013

Teresa Stanek Rea
*Acting Director of the United States Patent and Trademark Office*